Patented Sept. 19, 1939

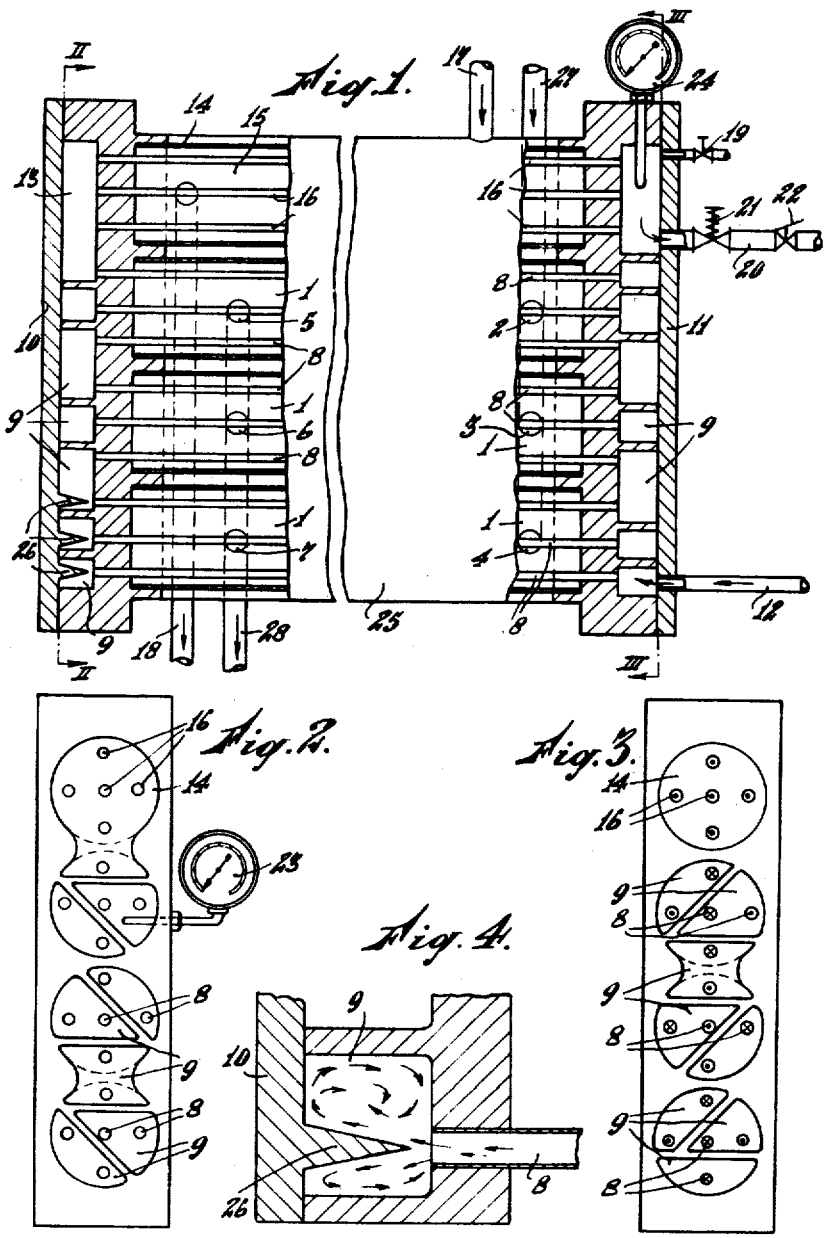

2,173,411

UNITED STATES PATENT OFFICE 2,173,411

PROCESS FOR STERILIZING LIQUIDS BY HEATING

Leonardus de Jonge, Rotterdam, Netherlands, assignor to the Syndicate Joxijdhoff, Rotterdam, Netherlands, composed of George Jacob van Jijderveld, Jr., George Jacob van Jijderveld, Sr., Johannes van 't Hoff, and Leonardus de Jonge Application February 18, 1935, Serial No. 7,143 In the Netherlands February 20, 1934

1 Claim. (Cl. 99—215)

It is known to sterilize liquids under pressure and it has also been proposed to pasteurize milk in so-called tube-pasteurizers, in which the liquid is conducted along a tortuous path through a system of tubes which is externally heated to pasterization temperature, the liquid being, however, exposed for an extended period, i. e., for several minutes, to the said temperature. Both methods have the disadvantages that the sterilized or pasteurized liquids, e. g., beer or milk, always have the unpleasant taste caused by pasteurization.

According to my invention it is now possible to sterilize liquids completely under conditions in which they will entirely retain their original taste and color, and will keep for an indefinite period of time.

There are also known devices for the sterilization of milk, in which the milk is conducted through a heating element, comprising a plurality of narrow tubes together forming a single conduit, the said tubes being housed in a casing provided with a feed line and a discharge line for the heating medium and having a cooler connected with the heating element. In this device milk at room temperature is brought to a high temperature within a very short time.

With these devices, however, one is not certain that the milk is really exposed for a sufficient period to the higher temperatures which are absolutely necessary for killing the spores, so that there always remains the possibility of obtaining a non-sterile product. This uncertainty is entirely removed by the application of the device according to my invention. For this purpose the novel device comprises at least two heating elements, the supply of the heating medium to each of the said elements being separately adjustable, and the individual tubes in each heating element being mutually connected by means of comparatively wide mixing chambers. In this manner the liquid after leaving each heating tube and before it enters into the next heating tube, is given a whirling motion, which causes the entire mass of liquid to obtain the same temperature.

In the known sterilizing device, on the contrary, the individual heating tubes are connected by means of bent pieces having the same diameter, which results in that the core of the flow of liquid always remains in the same place and consequently receives the least share of the heat, so that the same temperature will not be present in all parts of the flow of liquid.

The said whirling motion may further be promoted in the device according to the invention by providing in the mixing chambers a pointed projection opposite to and located in the axis of the heating tubes.

According to the invention it is possible to completely sterilize within a short time by a single treatment the most widely varying kinds of beverages such as beer, lemonade, cider, fruit juices, milk, cream, skimmed milk, etc., so that they will retain their original taste, color and composition.

My invention will now be further explained with reference to the drawing which may by way of example represents a device for sterilizing milk and milk products.

In the said drawing

Fig. 1 represents a view of the device according to my invention, part of it being a vertical cross section, Fig. 2 is a view according to the line II—II in Fig. 1 the closing piece being removed and Fig. 3 is a similar view according to the line III—III in Fig. 1 and Fig. 4 represents a detail on a somewhat enlarged scale.

The device according to Fig. 1 contains three heating elements comprising passages 1, for example tubes of a large diameter in which are located the narrow heating tubes 8. The said passages 1 are each connected with a steam supply tube 27 by means of the branch tubes 2, 3, 4 and with a steam exhaust pipe 28 by means of the branch tubes 5, 6, 7, the said branch tubes 2, 3, 4 each being provided with a cock or faucet (not shown).

By adjusting the said cocks it is possible to regulate the supply of steam to the heating elements and consequently their temperature. The diameter of the tubes 8 in the present case is 11 millimetres.

The outlet ends of the heating tubes 8 open into mixing chambers 9 to which the next tube is connected, so that the liquid to be sterilized is given a whirling motion in the said mixing chambers and will circulate through the tubes along a tortuous path. The mixing chambers are closed by two common closing pieces 10 and 11 in which latter closing piece there is provided a supply tube 12 for feeding the liquid to be sterilized into the lower tube 8. The end of the last narrow tube 8 which is located in the upper passage is connected here by means of a mixing chamber 13 to the cooler 14 which in the present embodiment is arranged above the heating elements. The said cooler consists of a passage 15 in which are provided five cooling tubes 16 through which the milk is flowing in counter-current with the cooling water. This cooling water is supplied by a tube 17 and leaves the cooler through a tube 18. The closing member 11 is provided with an air evacuation cock or faucet 19 and with a discharge tube 20 for the cooled liquid. The said tube 20 is provided with a pressure regulating valve 21 and with a safety valve 22. The complete device is housed in a casing 25. In order to promote the whirling motion in the mixing chambers 9 projections 26 may be provided on the closing plates 10 and 11 opposite the mouths of the tubes 8.

Such a projection is represented on a somewhat enlarged scale in Fig. 4 in which the preferably sharp point of the projection is located exactly in the axis of the tube 8. The whirling motion produced by this projection is indicated in the figure by the arrows.

After the entire device has been sterilized first, for instance by means of steam, fresh steam, e. g., under a pressure of about 8 atmospheres is introduced into the passages 1. The milk to be treated is then pressed likewise under a pressure of about 8 atmospheres into the tube 12 and will then flow with a great velocity of approximately 6 meters per second through the tubes 8. The said tubes each have a length of about 3.25 meters, so that the milk will have passed through the entire tube system 8 in approximately 8 seconds. The steam supply to the three passages 1 is regulated so that the temperature of the milk after leaving the last tube 8 of the lower heating element will be about 135° C., against about 145° C. upon leaving the last tube 8 of the intermediate heating element and about 150°-160° C. after leaving the last tube of the upper heating element. The said temperatures may be read from the thermometers placed in the relative mixing chambers, one of which thermometers is denoted in the drawing by 23. In the same manner the pressure in the mixing chambers and at the end of the cooler may be read from recording pressure gauges. The last recording pressure gauge is indicated in the drawing by 24.

When the pressure under which the milk is fed to the tube system through the tube 12 is as high as about 8 atmospheres the pressure regulating valve 21 in the tube 20 is adjusted so that at the end of the cooler the pressure will be about 6.5 atm.

In the tube system 8 the milk consequently is only for a few seconds exposed to the temperature required for completely killing all germs and spores, which in the case of milk preferably is as high as 140-160° C., but which always must be above 130° C.

In the cooler 14 the milk is cooled to about 80° C. and finally filled into sterilized bottles through the pipe line 20 connected to the feed line of the filling device. Milk treated in this manner will keep for an indefinite period of time without spoiling.

For sterilizing other liquids, such as, e. g., beer, heating to a lower temperature, for instance to about 90-100° C. will be sufficient and the tube system may be smaller in length, so that two heating elements will suffice.

It is obvious that it is necessary for beer and other beverages containing carbonic acid cooling is to be effected down to a temperature of about 0° C., in order to prevent the carbonic acid present in the beverage to start effervescing and being lost during filling.

It is an especially surprising feature that according to my present invention cream and even skimmed milk may be perfectly sterilized without any detriment.

I claim:

A process for perfectly sterilizing putrefiable liquids, comprising heating the liquid being treated under substantial pressure in a continuous zig-zag path constituted by the heating tubes of three heating elements, causing a whirling motion of the liquid at the end of each individual heating tube, regulating the supply of the heating medium to the individual heating elements in such manner that the temperature of the liquid being treated upon leaving the last heating tube of the first heating element is about 135° C., about 145° C. upon leaving the last heating tube of the second heating element, and about 155° C. upon leaving the last heating tube of the third heating element, exposing the liquid for only a few seconds to the temperatures required for completely killing all germs and spores, and subsequently cooling the sterilized liquid under pressure.

LEONARDUS DE JONGE.

---

CERTIFICATE OF CORRECTION.

Patent No. 2,173,411.              September 19, 1939.

LEONARDUS de JONGE.

It is hereby certified that error appears in the above numbered patent requiring correction as follows: In the heading to the printed specification, line 7, both occurrences, and in the grant, lines 3 and 4, and line 16, both occurrences, for "Jijderveld" read Zijderveld; line 2 of the grant, for "THE SYNDICATE" read the SYNDICATE; and line 15, strike out "The" before "Syndicate"; as shown by the record of assignments in this office; and that the said Letters Patent should be read with this correction therein that the same may conform to the record of the case in the Patent Office.

Signed and sealed this 2nd day of January, A. D. 1940.

(Seal)                                   Henry Van Arsdale,
                                            Acting Commissioner of Patents.

ing water. This cooling water is supplied by a tube 17 and leaves the cooler through a tube 18. The closing member 11 is provided with an air evacuation cock or faucet 19 and with a discharge tube 20 for the cooled liquid. The said tube 20 is provided with a pressure regulating valve 21 and with a safety valve 22. The complete device is housed in a casing 25. In order to promote the whirling motion in the mixing chambers 9 projections 26 may be provided on the closing plates 10 and 11 opposite the mouths of the tubes 8.

Such a projection is represented on a somewhat enlarged scale in Fig. 4 in which the preferably sharp point of the projection is located exactly in the axis of the tube 8. The whirling motion produced by this projection is indicated in the figure by the arrows.

After the entire device has been sterilized first, for instance by means of steam, fresh steam, e. g., under a pressure of about 8 atmospheres is introduced into the passages 1. The milk to be treated is then pressed likewise under a pressure of about 8 atmospheres into the tube 12 and will then flow with a great velocity of approximately 6 meters per second through the tubes 8. The said tubes each have a length of about 3.25 meters, so that the milk will have passed through the entire tube system 8 in approximately 8 seconds. The steam supply to the three passages 1 is regulated so that the temperature of the milk after leaving the last tube 8 of the lower heating element will be about 135° C., against about 145° C. upon leaving the last tube 8 of the intermediate heating element and about 150°-160° C. after leaving the last tube of the upper heating element. The said temperatures may be read from the thermometers placed in the relative mixing chambers, one of which thermometers is denoted in the drawing by 23. In the same manner the pressure in the mixing chambers and at the end of the cooler may be read from recording pressure gauges. The last recording pressure gauge is indicated in the drawing by 24.

When the pressure under which the milk is fed to the tube system through the tube 12 is as high as about 8 atmospheres the pressure regulating valve 21 in the tube 20 is adjusted so that at the end of the cooler the pressure will be about 6.5 atm.

In the tube system 8 the milk consequently is only for a few seconds exposed to the temperature required for completely killing all germs and spores, which in the case of milk preferably is as high as 140-160° C., but which always must be above 130° C.

In the cooler 14 the milk is cooled to about 80° C. and finally filled into sterilized bottles through the pipe line 20 connected to the feed line of the filling device. Milk treated in this manner will keep for an indefinite period of time without spoiling.

For sterilizing other liquids, such as, e. g., beer, heating to a lower temperature, for instance to about 90-100° C. will be sufficient and the tube system may be smaller in length, so that two heating elements will suffice.

It is obvious that it is necessary for beer and other beverages containing carbonic acid cooling is to be effected down to a temperature of about 0° C., in order to prevent the carbonic acid present in the beverage to start effervescing and being lost during filling.

It is an especially surprising feature that according to my present invention cream and even skimmed milk may be perfectly sterilized without any detriment.

I claim:

A process for perfectly sterilizing putrefiable liquids, comprising heating the liquid being treated under substantial pressure in a continuous zig-zag path constituted by the heating tubes of three heating elements, causing a whirling motion of the liquid at the end of each individual heating tube, regulating the supply of the heating medium to the individual heating elements in such manner that the temperature of the liquid being treated upon leaving the last heating tube of the first heating element is about 135° C., about 145° C. upon leaving the last heating tube of the second heating element, and about 155° C. upon leaving the last heating tube of the third heating element, exposing the liquid for only a few seconds to the temperatures required for completely killing all germs and spores, and subsequently cooling the sterilized liquid under pressure.

LEONARDUS DE JONGE.

---

CERTIFICATE OF CORRECTION.

Patent No. 2,173,411. September 19, 1939.

LEONARDUS de JONGE.

It is hereby certified that error appears in the above numbered patent requiring correction as follows: In the heading to the printed specification, line 7, both occurrences, and in the grant, lines 3 and 4, and line 16, both occurrences, for "Jijderveld" read Zijderveld; line 2 of the grant, for "THE SYNDICATE" read the SYNDICATE; and line 15, strike out "The" before "Syndicate"; as shown by the record of assignments in this office; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.